United States Patent
Jiang et al.

(10) Patent No.: US 9,509,814 B1
(45) Date of Patent: Nov. 29, 2016

(54) MOBILE TERMINAL

(71) Applicants: Hua Jiang, Shenzhen (CN); Li Han, Shenzhen (CN)

(72) Inventors: Hua Jiang, Shenzhen (CN); Li Han, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 15/061,834

(22) Filed: Mar. 4, 2016

(30) Foreign Application Priority Data

Jul. 31, 2015 (CN) .......................... 2015 1 0460536

(51) Int. Cl.
*H04M 1/00* (2006.01)
*H04M 1/02* (2006.01)

(52) U.S. Cl.
CPC .................................. *H04M 1/0274* (2013.01)

(58) Field of Classification Search
CPC ........... H04M 1/0202; H04M 1/0249; H04M 1/0254; H04M 1/0274
USPC ............ 455/575.1, 575.3, 575.4, 575.5, 90.3
See application file for complete search history.

(56) References Cited

U.S. PATENT DOCUMENTS

| 2013/0207854 A1* | 8/2013 | Ryu | H01Q 5/35 343/702 |
| 2014/0320359 A1* | 10/2014 | Wong | H01Q 5/35 343/749 |
| 2015/0270619 A1* | 9/2015 | Zhu | G01V 3/00 343/702 |

* cited by examiner

*Primary Examiner* — Tuan Pham
(74) *Attorney, Agent, or Firm* — Na Xu; IPro, PLLC

(57) ABSTRACT

A mobile terminal is disclosed. The mobile terminal includes a housing with an accommodation space, the housing including a metal rear cover serving as a radiator, the metal rear cover including a first metal part, a second metal part and a third metal part insulated to each other; a mainboard received in the accommodation space, the mainboard including a grounding part and a feed part; an antenna module including a grounding dynamic switch unit and a feed dynamic switch unit; wherein the grounding dynamic switch unit is connected between the grounding part and the first metal part, one end of the feed dynamic switch unit connects with the feed part, and the other end connects with the first metal part or the second metal part selectively.

10 Claims, 8 Drawing Sheets

MOBILE TERMINAL

FIELD OF THE INVENTION

The present invention relates to mobile communication technology field.

DESCRIPTION OF RELATED ART

With the continuous development of cell phone, tablet computer etc mobile terminals, people has higher and higher demand on the signal of terminal, calling effect and appearance of mobile communication. Due to the characteristics of metallic, robustness and abrasion resistance, the mobile terminal with full metal rear cover is loved by broad consumer.

Rest part is metal wire design. But as the metal part and nonmetal part exist diving and it can not guarantee that the appearance of the housing has very high consistency and the overall appearance of the mobile terminal is influenced. Another one kind of improved mobile terminal is to migrate overally the antenna module to the rear cover of the metal and take the metal rear cover as the antenna radiator. But this kind of structure exists the deficiencies that antenna resonance and bandwidth are hard to adjust. But the rear cover of full metal will form the role of shielding the signal formed by the antenna module inside the mobile terminal. In order to avoid metal rear cover disturbing antenna signal, the mobile terminal of related technology will have nonmetal design on the part on the metal rear cover that is opposite to the antenna module.

Therefore, it is necessary to provide a new mobile terminal to overcome the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
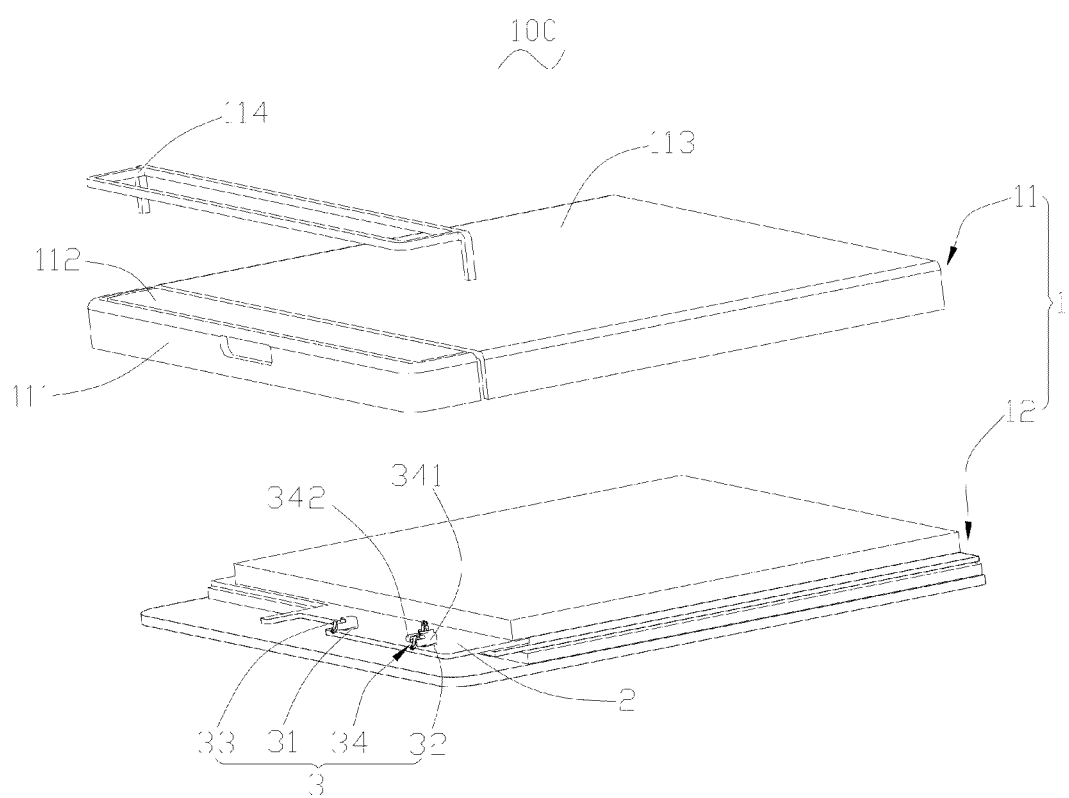
FIG. 1 is an isometric and exploded view of a mobile terminal in accordance with an exemplary embodiment of the present disclosure.

Referring to FIG. 1, the mobile terminal 100 includes a housing 1, a main board 2 and antenna module 3. The housing 1 has an accommodation space. The main board 2 and the antenna module 3 are received in the accommodation space of the housing 1.

The housing 1 includes a metal rear cover 11 and a display 12. The metal rear cover 11 and the display 12 are assembled together and form the accommodation space.

The metal rear cover 11 includes a first metal part 111, a second metal part 112, the third metal part 113 and an insulating tape 114. The insulating tape 114 is set on the junction of the first metal part 111, the second metal part 112 and the third metal part 113.

The first metal part 111 is formed by the frame of one side of the side of metal rear cover 11 and one frame of side of the same length extending from two ends of the frame of the side. The second metal part 112 is the rectangular metal sheet of the top face of the metal rear cover 11. The third metal part 113 is remained metal part after the metal rear cover 11 getting the first metal part 111 and the second metal part 112 removed. The third metal part 113 covers most of the areas of the mobile terminal 100 opposite to the surface of the display 12. The third metal part 113 assembles with the first metal part 111, the second metal part 112 and insulating tape 114 to form the metal rear cover 11. In the embodiment, the length of the second metal part 112 is 83.5 mm and width is 10.8 mm. It can be understood that the second metal part 112 can be configured to have different lengths and widths. The third metal part 113 can be remained metal part after the metal rear cover 11 getting metal rear cover 111 and the second metal part 112 removed and can only one part of them. The insulating tape 114 is used to make insulated connection among the first metal part 111, the second metal part 112 and the third metal 113. Optionally, the insulating tape 114 is insulating rubber material, and the width is 1.5 mm.

The main board 2 is used for bearing the partial structure of the antenna module 3 and other functional device of the mobile terminal as well.

Figure 2:
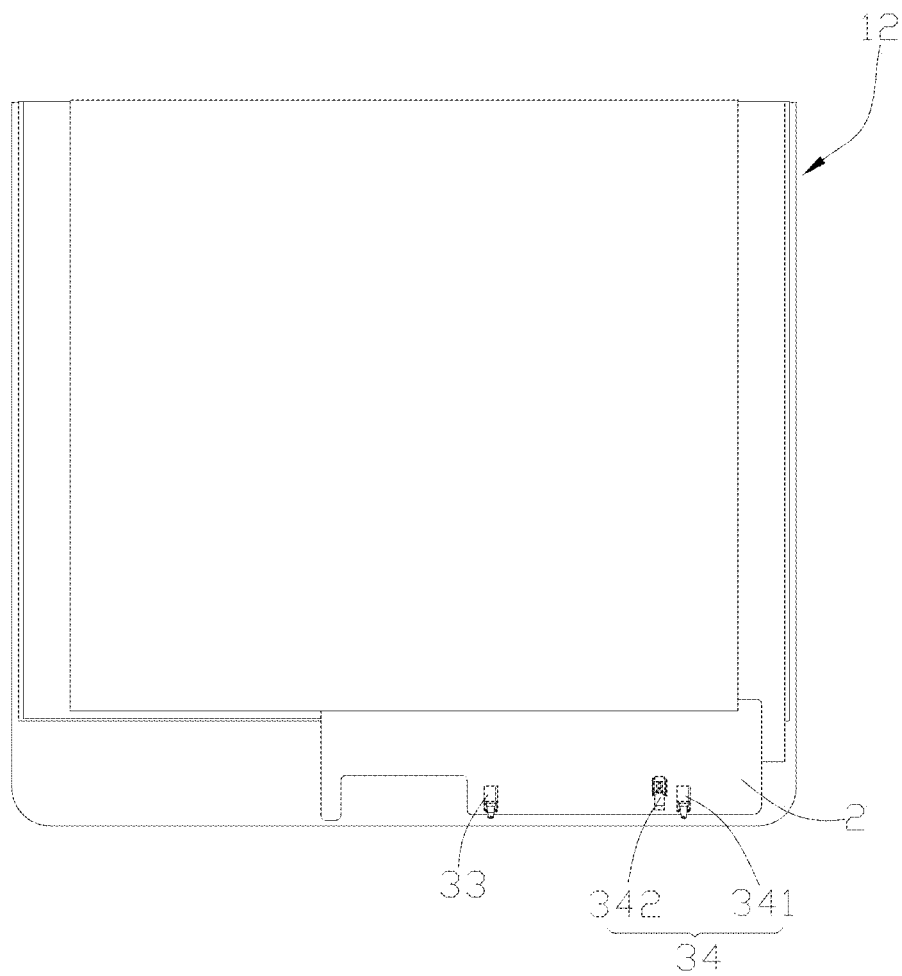
FIG. 2 is an isometric view of the mobile terminal in FIG. 1, wherein a metal cover thereof has been removed.

Referring to FIG. 2, in the embodiment of the invention, the antenna module 3 is an LTE antenna module. The frequency band of the LTE antenna module is 824 MHz-960 MHz or 1710 MHz-2690 MHz. Of course, in other replaceable embodiments, the antenna module can be the antenna module of other kinds such as diversity antenna module, WIFI antenna module etc.

The antenna module 3 includes a radiator, a data processing module (not shown), a grounding part 31, a feed part 32, a grounding dynamic switch unit 33 and a feed dynamic switch unit 34.

Figure 3:
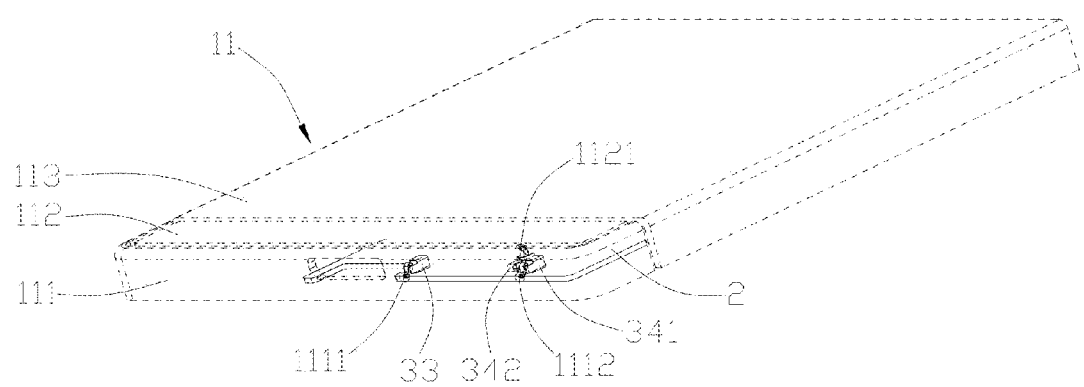
FIG. 3 is an illustration of the relative position relationship between the metal rear cover, grounding dynamic switch unit and feed dynamic switch unit.

In the embodiment, the radiator is the first metal part 111 and the second metal part 112. The data processing module, the grounding part 31, the feed part 32, the grounding dynamic switch unit 33 and the feed dynamic switch unit 34 are set on the surface of the main board 2. The data processing module is connected respectively with the grounding part 31 and the feed part 32 electrically. Referring to FIG. 3, the dynamic switch unit 33 is connected with the grounding part 31 and the metal part 111 electrically. The connection point of the dynamic switch unit 33 and the first metal part 111 is the first connection point 1111. One end of the feed dynamic switch unit 34 is connected with the feed part 32. The other end is connected with the first metal part 111 or the second metal part 112 selectively. The feed dynamic switch unit 34 includes the first feed dynamic switch 341 and the second feed dynamic switch 342. Wherein the first feed dynamic switch 341 is connected with the first metal part 111 electrically. The connection point of the first feed dynamic switch 341 and the first metal part 111 is the second connection point 1112. The second feed dynamic switch 342 is connected with the second metal part 112 electronically. The connection point of the second feed dynamic switch 342 and the second metal part 112 is the third connection point 1121.

Figure 4:
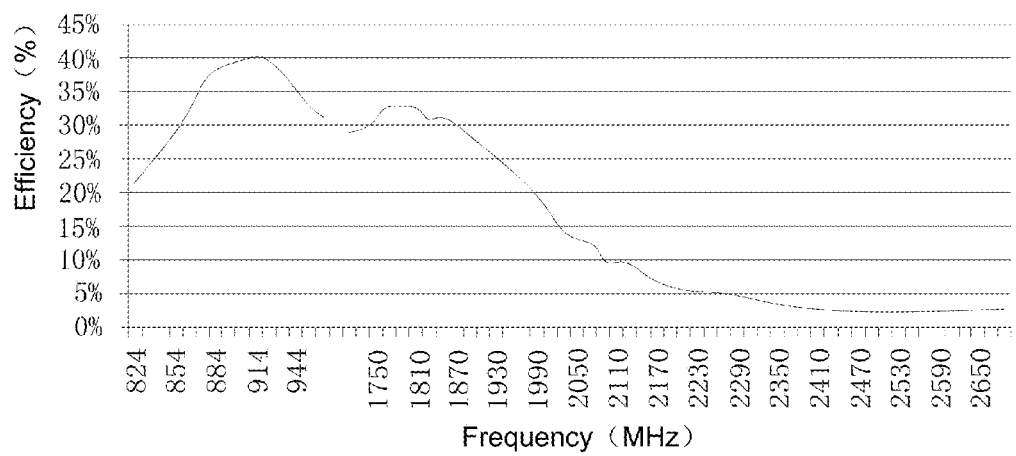
FIG. 4 shows the antenna efficiency of an antenna module of the mobile terminal at a first state corresponding to different frequencies.

Wherein, connected and disconnected states are achieved by the grounding dynamic switch unit 33. The feed dynamic switch unit 34 connects with the first metal part 111 or the second metal part 112 selectively, so the mobile terminal 100 has four work states under the cooperation and using of the grounding dynamic switch unit 33 and the feed dynamic switch unit 34. There are:

[The first state] When the grounding dynamic switch unit 33 and the first feed dynamic switch 341 are on the connected states, the feed part connects with the first metal part 111 electrically through the first feed dynamic switch 341, at this time, the working frequency bands of the antenna module 3 are 824 MHz-960 MHz and 1710 MHz-1880 MHz. When it is at the first state, please refer to FIG. 4. When it is at the first state, the antenna module 3 has very high efficiency under 824 MHz-960 MHz and 1710 MHz-1880 MHz. When frequency is higher than 1880 MHz, the efficiency of the antenna module 3 is lowered sharply.

Figure 5:
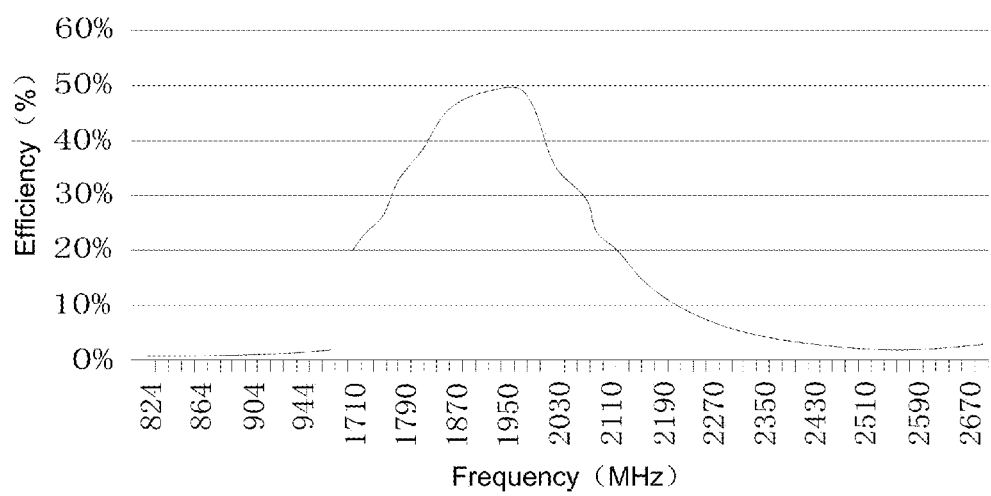
FIG. 5 shows the antenna efficiency of the antenna module of the mobile terminal at a second state corresponding to different frequencies.

[The second state] when the grounding dynamic switch unit 33 and the second feed dynamic switch 342 are on the connected state, the feed part connects with the second metal part 112 through the second feed dynamic switch 342 electrically, at this time, the working frequency bands of the antenna module 3 are 1850 MHz-1990 MHz and 1920 MHz-2170 MHz. When it is at the second state, please refer to FIG. 5. The antenna module 3 has very high efficiency under 1850 MHz-1990 MHz and 1920 MHz-2170 MHz these two frequency band. At this time, the efficiency of the antenna module 3 is zero basically within frequency band 824 MHz-960 MHz. When frequency is higher than 2170 MHz, the efficiency of the antenna 3 is lowered sharply.

Figure 6:
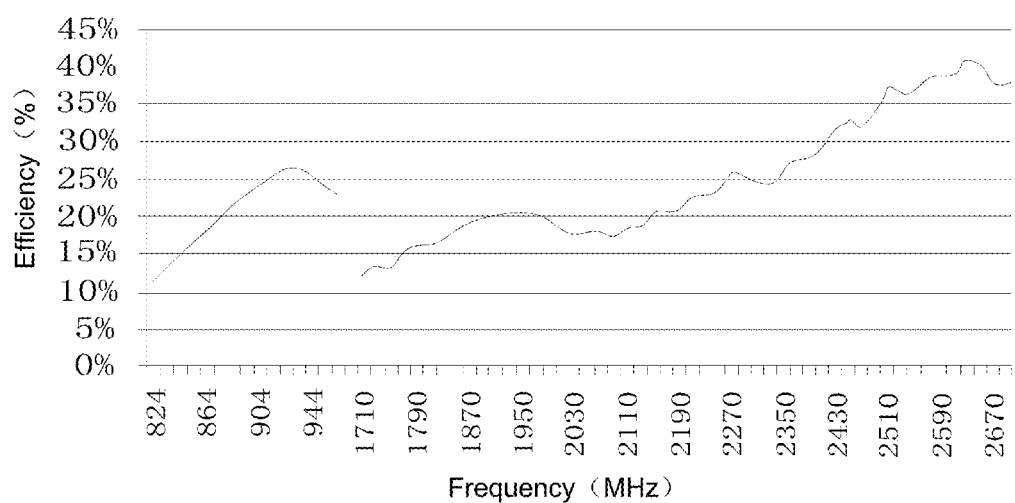
FIG. 6 shows the antenna efficiency of the antenna module of the mobile terminal at a third state corresponding to different frequencies.

[The third state] when the grounding dynamic switch unit 33 is at disconnected state and the first feed dynamic switch 341 is at connected state, the feed part connects with the first metal part 111 through the first feed dynamic switch 341, at this time, the working frequency band of the antenna module 3 is 2470 MHz-2690 MHz. When it is the third state, please refer to FIG. 6. The antenna module 3 has very high efficiency at the 2470 MHz-2690 MHz this frequency band, but low efficiency under 824 MHz-960 MHz and 1710 MHz-2470 MHz these two frequency bands.

[The fourth state] when the grounding dynamic switch unit 33 is at disconnected state and the second feed dynamic switch 342 is at connected state, the feed part connects with the second metal part 112 electrically through the second feed dynamic switch 342, at this time the working frequency of the antenna module 3 are 1920 MHz-2170 MHz and 2300 MHz-2470 MHz. When it is fourth state, please refer to FIG. 7. The antenna module 3 has higher efficiency under 1920 MHz-2170 MHz and 2300 MHz-2470 MHz but the efficiency of the antenna module 3 within 824 MHz-960 MHz is basically zero. The efficiency is very low within 2170 MHz-2300 MHz frequency band.

Figure 7:
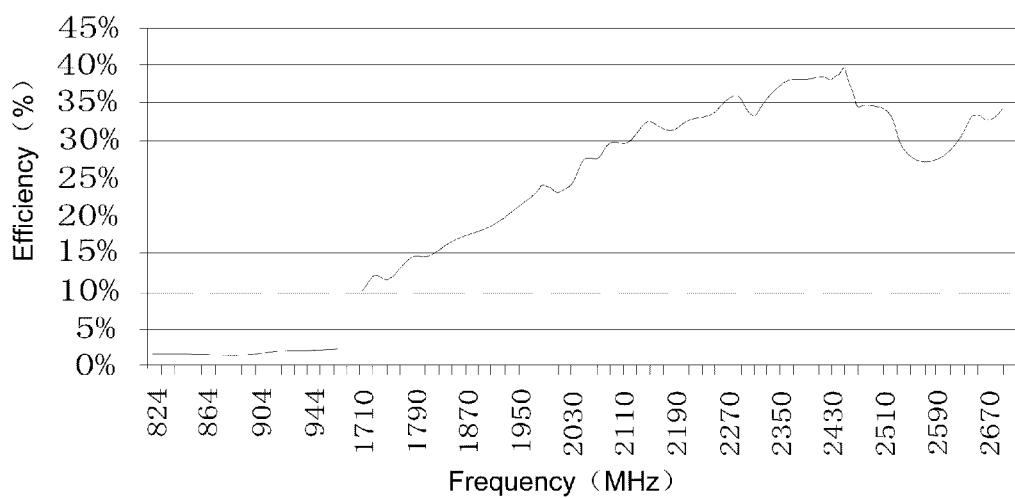
FIG. 7 shows the antenna efficiency of the antenna module of the mobile terminal at a fourth state corresponding to different frequencies.
Figure 8:
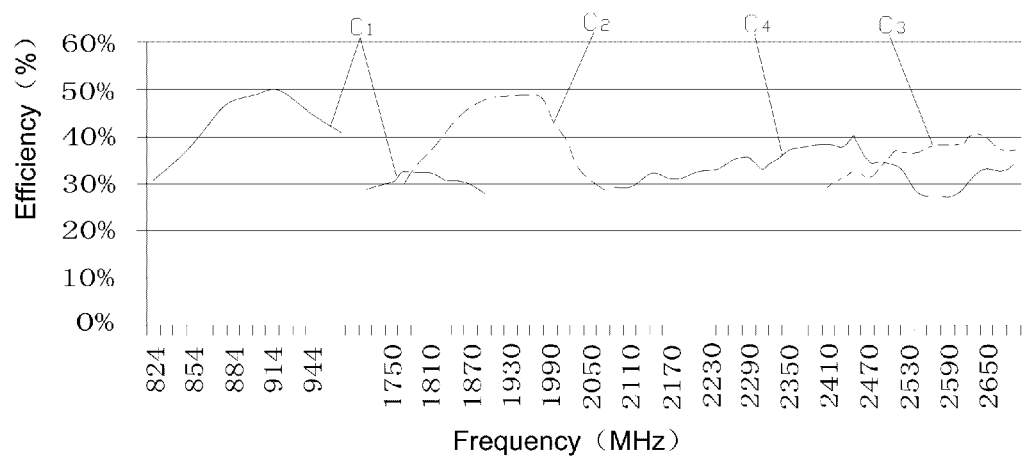
FIG. 8 shows the relatively high antenna efficiency of the antenna module of the mobile terminal at four states.

FIGS. 7-8 represent the schematic diagram of high efficiency of the first state, the second state, the third state and the fourth sate respectively. It can be seen visually from the diagram that the frequency band of the antenna module 3 in the above four states with very high efficiency completely cover 824 MHz-960 MHz and 1710 MHz-2690 MHz these two frequency bands, so the antenna module 3 has very high efficiency within these two frequency bands. Through the automatic cooperation and adjustment of the grounding dynamic switch unit 33 and the feed dynamic switch unit 34. The antenna module 3 has very high efficiency at frequency bands 824 MHz-960 MHz and 1710 MHz-2690 MHz to meet the demands of the user.

Among the mobile terminal provided by the invention, the resonance of the antenna module of the mobile terminal should be adjusted through the cooperation of work state of the grounding dynamic switch unit and feed dynamic switch unit to make the antenna module to keep very high efficiency within 824 MHz-960 MHz and 1710 MHz-2690 MHz to meet the demands of customer.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile terminal, comprising:
a housing with an accommodation space, the housing including a metal rear cover serving as a radiator, the metal rear cover including a first metal part, a second metal part and a third metal part insulated to each other;
a mainboard received in the accommodation space, the mainboard including a grounding part and a feed part;
an antenna module, including a grounding dynamic switch unit and a feed dynamic switch unit;
wherein the grounding dynamic switch unit is connected between the grounding part and the first metal part, one end of the feed dynamic switch unit connects with the feed part, and the other end connects with the first metal part or the second metal part selectively.

2. The mobile terminal as described in claim 1, wherein the feed dynamic switch unit includes a first feed dynamic switch connected with the first metal part electrically and a second feed dynamic switch connected with the second metal part electrically.

3. The mobile terminal as described in claim 1, wherein the metal rear cover further includes an insulating tape disposed on a junction of the first metal part, the second metal part and the third metal part.

4. The mobile terminal as described in claim 2, wherein the first metal part is formed by the frame of one side of the metal rear cover and the frame of one section of side with the same length extended from two ends of frame of the side, the second metal part is a rectangular metal sheet of a top surface of the metal rear cover.

5. The mobile terminal as described in claim 4, wherein the first metal part and the second metal part serve as a radiator of the antenna module.

6. The mobile terminal as described in claim 2, wherein when the grounding dynamic switch unit and the first feed dynamic switch are on the connected state, the feed terminal is connected with the first metal terminal through the first feed dynamic switch electrically, at this time, the working frequency bands of the antenna module is 824 MHz-960 MHz and 1710 MHz-1880 MHz.

7. The mobile terminal as described in claim 2, wherein when the grounding dynamic switch unit and the second feed dynamic switch are on connected state, the feed terminal is connected with the second metal terminal through the second feed dynamic switch, at this time the working frequency bands of the antenna module are 1850 MHz-1990 MHz and 1920 MHz-2170 MHz.

8. The mobile terminal as described in claim 2, wherein when the grounding dynamic switch unit is on disconnected state and the first feed dynamic switch are on the connected state, the feed terminal is connected with the first metal terminal through the first feed dynamic switch electronically, at this time, the working frequency band of the antenna module is 2470 MHz-2690 MHz.

9. The mobile terminal as described in claim 2, wherein when the grounding dynamic switch unit is on the disconnected state and the second feed dynamic switch is on the connected state and the feed terminal is connected with the second metal terminal through the second feed dynamic switch electronically, at this time the working frequency bands of the antenna module are 1920 MHz-2170 MHz and 2300 MHz-2470 MHz.

10. The mobile terminal as described in claim 1, wherein the antenna module is an LTE antenna module.

* * * * *